Nov. 18, 1958  C. S. KELLEY  2,861,113
RECOVERY AND USE OF OLEFINS AND HYDROGEN SULFIDE IN GASES
Filed Dec. 27, 1954
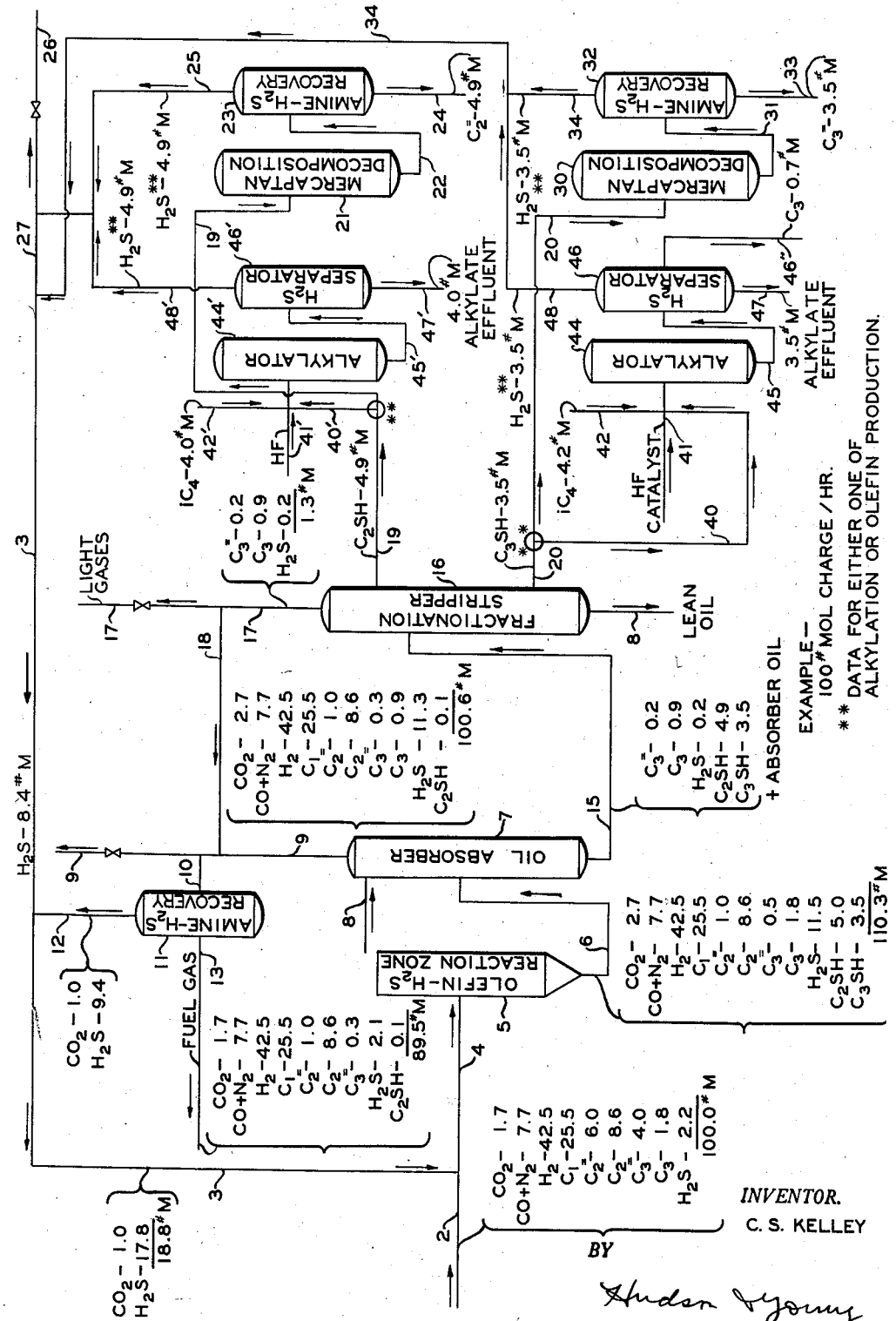
INVENTOR.
C. S. KELLEY
BY
ATTORNEYS

United States Patent Office 2,861,113
Patented Nov. 18, 1958

2,861,113

RECOVERY AND USE OF OLEFINS AND HYDROGEN SULFIDE IN GASES

Carl S. Kelley, Bartlesville, Okla., assignor to Phillips Petroleum Company, a corporation of Delaware Application December 27, 1954, Serial No. 477,779

22 Claims. (Cl. 260—677)

This invention relates to the utilization of mixtures of gases containing low-boiling hydrocarbons and hydrogen sulfide. In one of its aspects, the invention relates to the utilization of cracked hydrocarbon gases containing hydrogen sulfide, or to which hydrogen sulfide has been added, by converting olefinic constituents in said gases to mercaptans, recovering low-boiling mercaptans from the mercaptan conversion effluent and converting said mercaptans to substantially pure olefins and/or alkylating at least one of said low-boiling mercaptans with a low-boiling isoparaffin. In another aspect of the invention it relates to the conversion of olefins to mercaptans employing a bauxite catalyst. In still another aspect of the invention, it relates to the alkylation of an isoparaffin with a low-boiling alkyl mercaptan to produce an alkylate and hydrogen sulfide.

Other aspects, objects and the several advantages of the invention are apparent from this disclosure, the drawing, and the appended claims.

According to this invention, there is provided a process for the recovery from gases containing the same of low-boiling olefins, hydrogen sulfide, and an alkylate. Thus, according to the invention, there is provided a process in which olefins contained in a gas stream are converted to mercaptans, the mercaptans recovered, and, if desired, fractionated, and then decomposed to yield substantially pure olefins by separation of them from hydrogen sulfide concomitantly formed in which process at least a portion of at least one of the mercaptans obtained can be employed to alkylate a low-boiling isoparaffin, all as more fully described hereinafter.

The drawing illustrates a specific modus operandi according to the invention. It is to be understood that the drawing is diagrammatic only and is greatly simplified omitting apparatus components which are not necessary to a full understanding of the combination of steps, or individual steps, which are involved.

Referring to the drawing, in the embodiment shown a refinery cracked gas containing hydrogen, hydrogen sulfide, nitrogen, methane, ethane, propane, ethylene, propylene, and a trace of $C_4$ hydrocarbons is fed by way of conduit 2 together with hydrogen sulfide from conduit 3 by way of conduit 4 into reactor 5.

In reactor 5, mercaptan-forming reactions are maintained and according to the invention, bauxite is employed as a catalyst to advantageously convert the olefins and hydrogen sulfide to mercaptans in good yield without forming undesirably high proportions of by-products which are to be avoided. Effluent from the reactor is passed by way of conduit 6 into oil absorber 7 in which a lean oil fed by way of conduit 8 removes from said reaction effluent substantially all of the mercaptans which have been formed in reactor 5. Overhead from absorber 7 comprises hydrogen sulfide, nitrogen, hydrogen, and light hydrocarbons such as methane, ethane, and propane which are removed from absorber 7 by way of conduit 9 to fuel gas, alternatively, at least in part, by way of conduit 10 to a hydrogen sulfide recovery unit 11 wherein hydrogen sulfide is recovered and separated from said gases and passed by way of conduit 12 to conduit 3 for reuse or to storage. The hydrogen sulfide-free gases from recovery unit 11 are removed for fuel gas or other utilities by way of conduit 13. Enriched absorber oil from absorber 7 passes by way of conduit 15 to stripper fractionator 16 wherein fractionation and stripping operations are effected. Light gases are removed overhead by way of conduit 17 and may be passed at least in part by way of conduit 18 to conduit 9 and then by way of conduit 10 to hydrogen sulfide recovery unit 11. Lean oil recovered as bottoms from stripper-fractionator 16 is passed by way of conduit 8 to absorber 7. From stripper-fractionator 16 there are obtained two principal mercaptan streams, ethyl mercaptan by way of conduit 19, and propyl mercaptan by way of conduit 20. Ethyl mercaptan is passed by way of conduit 19 to mercaptan decomposer unit 21. In this unit, the mercaptan is decomposed with the aid of heat and a catalyst, for example, bauxite, which can be regenerated bauxite priorly employed in reactor 5, and therein decomposed to yield hydrogen sulfide and ethylene which are passed by way of conduit 22 into amine hydrogen sulfide recovery unit 23 wherein, by conventional means, ethylene is recovered and removed by way of conduit 24 substantially free from hydrogen sulfide. Hydrogen sulfide is removed by way of conduit 25 to conduit 26 and removed to storage and/or returend by way of conduit 27 and conduit 3 to reactor 5. Propyl mercaptan is passed by way of conduit 20 to mercaptan decomposer 30 wherein under conditions similar to those prevailing in mercaptan decomposer 21, the propyl mercaptan is converted to a gas stream containing hydrogen sulfide and propylene which are passed by way of conduit 31 to amine hydrogen sulfide recovery unit 32 from which substantially pure propylene is recovered and passed to storage by way of conduit 33 and hydrogen sulfide is recovered by way of conduit 34 and passed to conduit 27 and/or conduit 3.

Propyl mercaptan is removed from conduit 20, by way of conduit 40 and therein is admixed with an alkylation catalyst, which in this embodiment is hydrofluoric acid or sulfuric acid, introduced by way of conduit 41, and with low-boiling isoparaffin which in this embodiment is isobutane, introduced by way of conduit 42, and passed by way of conduit 43 to alkylation in alkylator 44. Alkylation effluent is removed from 44 by way of conduit 45 and passed to hydrogen sulfide separator unit 46. Alkylation effluent is recovered and removed from the process as a product by way of conduit 47 and upon separation of acid and further treatment, not shown, can be utilized as a component in motor fuel or for other purposes as is well-known in the art. Hydrogen sulfide is removed from separator 46 by way of conduit 48 and passed by way of conduit 34 into conduit 3 and/or conduit 27. A small proportion of propane resulting from the alkylation reaction is removed by way of conduit 46''.

Ethyl mercaptan is also removed from conduit 19 by way of conduit 40', admixed with alkylation catalyst, in this embodiment, hydrofluoric acid or sulfuric acid, introduced by way of conduit 41' and with low-boiling isoparaffin, in this embodiment, isobutane, introduced by way of conduit 42' and passed by way of conduit 43' to alkylation in alkylator 44' from which an alkylation effluent is removed by way of conduit 45' and passed to hydrogen sulfide separator unit 46'. Alkylation effluent is recovered and removed from the process as product by way of conduit 47', and upon separation of acid and further treatment, not shown, can be utilized as a component in motor fuel or for other purposes as is well known in the art. Hydrogen sulfide is removed from separator 46' by way of conduit 48'' and is passed into conduit 3 and conduit 27. A propane stream is removed from separator 46 via 46''. (This resulted from the alkylation reaction.)

The compositions of streams shown on the drawing are, of course, illustrative of the invention and are not intended to be limiting in the sense that the invention is performable only with the specific compositions set forth. However, the reader will have noted especially that the specific combination of steps provides a highly economical manner of utilizing the various streams which are not only intermediates, in the sense that they are not necessarily recovered as products of the process but also, in the overall, for obtaining those streams which are removed as products of the process.

Table I shows the percentage composition and the quantities flowing in the respective conduits of the system described. The conditions of operation are shown in Table II. These conditions are the now preferred conditions and one skilled in the art will be able to vary, modify or extend the said conditions, where possible to do so, upon a study of this specification, drawing and the claims and the selection of a specific desired operation to be accomplished.

(c) Catalyst—bauxite
(d) Regeneration—burn off sulfur and carbon with steam air mixture at 700–1100° F.

2. MERCAPTAN DECOMPOSITION (21 AND 30)

(a) Temp. ° F.—450–900
(b) Pressure, p. s. i. a.—0–200
(c) Regeneration—steam-air mixture at 700–1100° F.

3. PROPYL MERCAPTAN LIQUID PHASE (ONLY) ALKYLATION (44)

(a) HF catalyst:
  (1) Temp. ° F., 70–110
  (2) 4.0 to 1.0 up to 10.0 to 1.0 mol ratio of isobutane to propyl mercaptan
  (3) Catalyst—
    85–95% HF
    0.5–2.5% $H_2O$
    2.5–10.0% polymer oil formed in reaction
    2.0–5.0% butane
  (4) The makeup acid is 99+% HF
(b) $H_2SO_4$ catalyst:
  (1) Temp. ° F., 20–70

TABLE I

| Conduit | 2 | | 3 | | 4 | | 6 | | 9 | | 15* | | 17 and 18 | | 12 | | 13 | | 19 | |
|---|---|---|---|---|---|---|---|---|---|---|---|---|---|---|---|---|---|---|---|---|
| | Mols | | Mols | | Mols | | Mols | | Mols | | Mols | | Mols | | Mols | | Mols | | Mols | |
| | Percent | #/hr. | Percent | #/hr. | Percent | #/hr. | Percent | #/hr. | Percent | #/hr. | Percent | #/hr. | Percent | #/hr. | Percent | #/hr. | Percent | #/hr. | Percent | #/hr. |
| Component: | | | | | | | | | | | | | | | | | | | | |
| $CO_2$ | 1.7 | 17 | 5.3 | 10 | 2.3 | 27 | 2.4 | 27 | 2.7 | 27 | | | | | 9.6 | 10 | 1.9 | 17 | | |
| $CO+N_2$ | 7.7 | 77 | | | 6.5 | 77 | 7.0 | 77 | 7.6 | 77 | | | | | | | 8.6 | 77 | | |
| $H_2$ | 42.5 | 425 | | | 35.8 | 425 | 38.6 | 425 | 42.3 | 425 | | | | | | | 47.6 | 425 | | |
| $CH_4$ | 25.5 | 255 | | | 21.5 | 255 | 23.1 | 255 | 25.4 | 255 | | | | | | | 28.5 | 255 | | |
| $C_2H_4$ | 6.0 | 60 | | | 5.0 | 60 | 0.9 | 10 | 1.0 | 10 | | | | | | | 1.1 | 10 | | |
| $C_2H_6$ | 8.6 | 86 | | | 7.2 | 86 | 7.8 | 86 | 8.5 | 86 | | | | | | | 9.6 | 86 | | |
| $C_3H_6$ | 4.0 | 40 | | | 3.4 | 40 | 0.5 | 5 | 0.3 | 3 | 2.1 | 2 | 15.4 | 2 | | | 0.3 | 3 | | |
| $C_3H_8$ | 1.8 | 18 | | | 1.5 | 18 | 1.6 | 18 | 0.9 | 9 | 9.3 | 9 | 69.2 | 9 | | | 2.3 | 21 | | |
| $H_2S$ | 2.2 | 22 | 94.7 | 178 | 16.8 | 200 | 10.4 | 115 | 11.2 | 113 | 2.1 | 2 | 15.4 | 2 | 90.4 | 94 | 0.1 | 1 | | |
| $C_2H_5SH$ | | | | | | | 4.5 | 50 | 0.1 | 1 | 50.5 | 49 | | | | | | | | |
| $C_3H_7SH$ | | | | | | | 3.2 | 35 | | | 36.0 | 35 | | | | | | | 100.0 | 49 |
| Isobutane | | | | | | | | | | | | | | | | | | | | |
| Alkylate Eff. | | | | | | | | | | | | | | | | | | | | |
| Total | 100.0 | 1,000 | 100.0 | 188 | 100.0 | 1,188 | 100.0 | 1,103 | 100.0 | 1,006 | 100.0 | 97 | 100.0 | 13 | 100.0 | 104 | 100.0 | 895 | 100.0 | 49 |

| Conduit | 20 | | 42 | | 47 | | 46'' | | 48 or 34** | | 33 | | 24 | | 47' | | 25 or 48'** | | 42' | |
|---|---|---|---|---|---|---|---|---|---|---|---|---|---|---|---|---|---|---|---|---|
| | Mols | | Mols | | Mols | | Mols | | Mols | | Mols | | Mols | | Mols | | Mols | | Mols | |
| | Percent | #/hr. | Percent | #/hr. | Percent | #/hr. | Percent | #/hr. | Percent | #/hr. | Percent | #/hr. | Percent | #/hr. | Percent | #/hr. | Percent | #/hr. | Percent | #/hr. |
| Component: | | | | | | | | | | | | | | | | | | | | |
| $CO_2$ | | | | | | | | | | | | | | | | | | | | |
| $CO+N_2$ | | | | | | | | | | | | | | | | | | | | |
| $H_2$ | | | | | | | | | | | | | | | | | | | | |
| $CH_4$ | | | | | | | | | | | | | | | | | | | | |
| $C_2H_4$ | | | | | | | | | | | | | | | | | 100.0 | 49 | | |
| $C_2H_6$ | | | | | | | | | | | | | | | | | | | | |
| $C_3H_6$ | | | | | | | | | | | 100.0 | 35 | | | | | | | | |
| $C_3H_8$ | | | | | | | 100.0 | 7 | | | | | | | | | | | | |
| $H_2S$ | | | | | | | | | 100.0 | 35 | | | | | | | | | | |
| $C_2H_5SH$ | | | | | | | | | | | | | | | 100.0 | 49 | | | | |
| $C_3H_7SH$ | 100.0 | 35 | | | | | | | | | | | | | | | | | 100.0 | 40 |
| Isobutane | | | 100.0 | 42 | | | | | | | | | 100.0 | 40 | | | | | | |
| Alkylate Eff. | | | | | 100.0 | 35 | | | | | | | | | | | | | | |
| Total | 100.0 | 35 | 100.0 | 42 | 100.0 | 35 | 100.0 | 7 | 100.0 | 35 | 100.0 | 35 | 100.0 | 49 | 100.0 | 40 | 100.0 | 49 | 100.0 | 40 |

* Less absorber oil.
** Figures are for either alkylation or olefin manufacture.

It will be noted that the data of Table I are for either olefin production or alkylation. When both operations are simultaneously conducted the streams will, of course, be reduced in proportion to the split of the mercaptan stream.

TABLE II

*Operating conditions*

1. MERCAPTAN FORMING REACTION (5)

(a) Temp., ° F.—150–300
(b) Pressure, p. s. i. g.—100–400

(2) 5.0 to 1.0 up to 10.0 to 1.0 mol ratio of isobutane to propyl mercaptan
  (3) Catalyst—82–94% $H_2SO_4$

4. ETHYL MERCAPTAN LIQUID PHASE (ONLY) ALKYLATION (44')

(a) HF catalyst:
  (1) Temp. ° F., 100–140
  (2) 5.0 to 1.0 up to 14.0 to 1.0 mol ratio of isobutane to ethyl mercaptan
  (3) Catalyst 88–95% HF and trace of $BF_3$ may be added (b) H₂SO₄ catalyst:
(1) Temp., °F. 40–90
(2) 6.0 to 1.0 up to 10.0 to 1.0 mol ratio of isobutane to ethyl mercaptan
(3) Catalyst—82–94% H₂SO₄

The use of bauxite in the mercaptan-forming reaction leading to the reacting out from the feed stream of ethylene, and propylene, by way of conversion to mercaptans, and then recovering said gases as described herein, is considered to be a particularly advantageous feature of the present invention. Bauxite is readily and relatively cheaply available and operative over a wide range of temperatures. However, silica-alumina synthetic catalyst, and silica-based phosphate salt catalysts can also be employed. It is possible also to employ halogen activated bauxite or silica-alumina catalysts. Certain mixtures of the foregoing catalysts can be prepared and proportioned to permit a highly directed or selective operation in the mercaptan-forming step in reactor 5.

The absorber oil which is employed according to the invention is one which possesses the characteristics required for the absorption of mercaptans and can be a mineral seal oil such as now employed in oil absorption processes known to the art.

The hydrogen sulfide recovery units as illustrated by 11, 23 and 32 can be conventional ethanolamine recovery units which are also well-known to the art for the separation of hydrogen sulfide from hydrocarbons. The conditions of operation for such units are known in the art.

Reasonable variation and modification as possible within the scope of the foregoing disclosure, the drawing, and the appended claims to the invention, the essence of which is that conversion of olefins to mercaptans employing bauxite as a catalyst and recovery of substantially pure olefins, for example, ethylene, and alkylation of at least one mercaptan, formed in the process, for example, propyl mercaptan, with a low-boiling isoparaffin, all substantially as set forth and described herein have been provided and that a unitary modus operandi for the recovery from a stream of cracked gases, or similar gases, of hydrogen sulfide, pure low-boiling olefins, such as ethylene and propylene, and an alkylate produced by way of a mercaptan has also been provided, the combinations of steps in the unitary process being effectuated substantially as described herein.

I claim:

1. A process for the production of a high quality and concentration ethylene gas and a propylene alkylate, from a cracked hydrocarbon gas containing ethylene, propylene, hydrogen sulfide, and other gases, which comprises admixing with said cracked hydrocarbon gases hydrogen sulfide obtained as hereinafter stated and reacting the admixture thus obtained over a bauxite catalyst under conditions and in a manner so as to produce an effluent containing ethyl mercaptan and propyl mercaptan, passing said effluent to an oil absorption zone and therein absorbing into an absorption oil mercaptans and heavier materials present in said effluent, obtaining from said absorption zone an overhead comprising: hydrogen sulfide, light hydrocarbons, and other gases, treating said gases to recover hydrogen sulfide therefrom and recycling said hydrogen sulfide for admixture with said cracked hydrocarbon gases, fractionating the absorption oil containing said mercaptans to obtain therefrom ethyl mercaptan as a stream and propyl mercaptan as another stream and lean absorption oil as a still further stream, passing said ethyl mercaptan under desulfurizing conditions into contact with a bauxite desulfurization catalyst so as to obtain an effluent containing ethylene and hydrogen sulfide, separating said hydrogen sulfide from said ethylene and recycling said hydrogen sulfide for admixture with said cracked hydrocarbon gases, recovering ethylene substantially free from all other gases including hydrogen sulfide as a product of the process, admixing said propyl mercaptan with isobutane and under alkylating conditions passing the propyl mercaptan-isobutane admixture thus obtained into contact with an alkylation catalyst, recovering from the alkylation effluent hydrogen sulfide and recycling the same for admixture with said cracked hydrocarbon gases and also recovering from said alkylation effluent a propylene alkylate.

2. A process for the production of a propylene alkylate, from a cracked hydrocarbon gas containing ethylene, propylene, hydrogen sulfide, and other gases, which comprises reacting said gas in the presence of a bauxite catalyst under conditions and in a manner so as to produce an effluent containing propyl mercaptan, passing said effluent to an oil absorption zone and therein absorbing into an absorption oil mercaptan and heavier materials present in said effluent, obtaining from said absorption zone overhead comprising hydrogen sulfide, light hydrocarbons, and other gases, fractionating the absorption oil containing said mercaptan to obtain therefrom propyl mercaptan as a stream and lean absorption oil as a still further stream, admixing said propyl mercaptan with isobutane and, under alkylating conditions, passing the propyl mercaptan-isobutane admixture thus obtained into contact with an alkylation catalyst, recovering from the alkylation effluent hydrogen sulfide and a propylene alkylate.

3. A process according to claim 2 wherein the recovered hydrogen sulfide is admixed with said cracked hydrocarbon gas as at least a portion of the hydrogen sulfide used to produce the propyl mercaptan.

4. A process for the production of a propylene alkylate from a gas containing ethylene, propylene, hydrogen sulfide, and other gases, which comprises contacting said gas under mercaptan-forming conditions with a catalyst so as to produce an effluent containing propyl mercaptan, separating from said effluent a propyl mercaptan stream, admixing said propyl mercaptan stream with a low-boiling isoparaffin and under alkylating conditions, passing the propyl mercaptan-low-boiling isoparaffin admixture, thus obtained, into contact with an alkylation catalyst and recovering from the alkylation effluent hydrogen sulfide and a propylene alkylate.

5. A process according to claim 4 wherein said low-boiling isoparaffin is isobutane.

6. The recovery of ethylene from a gas containing it together with other gases which comprises at a temperature in the range 150–300° F. passing said gas together with hydrogen sulfide into contact with a bauxite catalyst to form an ethyl mercaptan containing effluent, recovering ethyl mercaptan from said effluent, decomposing said mercaptan to ethylene and hydrogen sulfide and separating ethylene and hydrogen sulfide into separate streams.

7. The separation of low-boiling olefins from a cracked hydrocarbon gas containing the same which comprises admixing with said gas hydrogen sulfide, contacting the admixture thus obtained under mercaptan-forming conditions and at a temperature in the range 150–300° F. with a bauxite catalyst so as to obtain mercaptans from said olefins, separating said mercaptans from the catalyst effluent, decomposing said mercaptans to olefins and hydrogen sulfide, and separating the same into a hydrogen sulfide stream and an olefin-containing stream.

8. A process for the production of a high quality and concentration ethylene gas from a cracked hydrocarbon gas containing ethylene, propylene, hydrogen sulfide, and other gases which comprises reacting said gas in the presence of a bauxite catalyst under conditions and in a manner so as to produce an effluent containing ethyl mercaptan, passing said effluent to an oil absorption zone and therein absorbing into an absorption oil mercaptan and heavier materials present in said effluent, obtaining from said absorption zone an overhead comprising hydrogen sulfide, light hydrocarbons, and other gases, fractionating the absorption oil containing said mercaptan to obtain therefrom ethyl mercaptan as a stream and lean absorption oil as a still further stream, passing said ethyl mercaptan under desulfurizing conditions into contact with a bauxite desulfurization catalyst so as to obtain an effluent containing ethylene and hydrogen sulfide, separating said hydrogen sulfide from said ethylene and recovering ethylene substantially free from all other gases, including hydrogen sulfide, as a product of the process.

9. A process according to claim 8 wherein the hydrogen sulfide is admixed with said cracked hydrocarbon gas as at least a portion of the hydrogen sulfide which is reacted to produce the ethyl mercaptan.

10. A process for the production of a high quality and concentration ethylene gas from a gas containing ethylene, propylene, hydrogen sulfide, and other gases, which comprises contacting said gas under mercaptan-forming conditions with a catalyst so as to produce an effluent containing ethyl mercaptan, separating from said effluent an ethyl mercaptan stream, passing said ethyl mercaptan stream under desulfurizing conditions into contact with a desulfurization catalyst so as to obtain an effluent containing ethylene and hydrogen sulfide, separating said hydrogen sulfide from said ethylene and recovering ethylene as a product of the process.

11. A process according to claim 10 wherein the catalyst in the mercaptan-forming step is bauxite.

12. A process according to claim 10 wherein the catalyst in the desulfurization step is bauxite.

13. The alkylation of isobutane with propyl mercaptan at a temperature in the range 20–140° F. in the presence of a catalyst selected from sulfuric acid and hydrofluoric acid.

14. A process for the production of a low-boiling alkylate of isobutane which comprises, under alkylating conditions including a temperature in the range 70–110° F. and the presence of an HF alkylation catalyst, alkylating isobutane with propyl mercaptan.

15. A process for producing a low-boiling alkylate of isobutane which comprises, under alkylating conditions including a temperature of 20–70° F. and the presence of an $H_2SO_4$ alkylation catalyst, alkylating isobutane with propyl mercaptan.

16. A process for producing a low-boiling isobutane alkylate which comprises, under alkylating conditions including a temperature in the range of 100–140° F. and the presence of an HF alkylation catalyst, alkylating isobutane with ethyl mercaptan.

17. A process for producing a low-boiling isobutane alkylate which comprises, under alkylating conditions including a temperature in the range of 40–90° F. and the presence of an $H_2SO_4$ alkylation catalyst, alkylating isobutane with ethyl mercaptan.

18. A process for producing an alkylate product from a low-boiling isoparaffin and a low-boiling mercaptan which comprises bringing together into intimate contact said isoparaffin and said mercaptan under conditions under which an alkylation reaction between them occurs, said conditions including contact of said isoparaffin and said mercaptan with an alkylation catalyst at a temperature in the range 20–140° F., for a time sufficient to obtain a desired amount of an alkylate product and then recovering said alkylate product.

19. A process for producing an alkylate product from isobutane and propyl mercaptan which comprises bringing together into intimate contact said isoparaffin and said mercaptan under conditions under which an alkylation reaction between them occurs, said conditions including contact of said isoparaffin and said mercaptan with an alkylation catalyst at a temperature in the range 20–140° F., for a time sufficient to obtain a desired amount of an alkylate product and then recovering said alkylate product.

20. The reaction under alkylating conditions, including a temperature in the range 20–140° F. and the presence of an acid alkylation catalyst, of a low-boiling isoparaffin and a low-boiling mercaptan.

21. The reaction according to claim 20 wherein the low-boiling isoparaffin is substantially isobutane and the low-boiling alkyl mercaptan is substantially propyl mercaptan and the acid alkylation catalyst is selected from the group consisting of HF and $H_2SO_4$ alkylation catalysts, wherein when HF is the catalyst selected the temperature is in the range 70–110° F., the molar ratio of isobutane to propyl mercaptan is in the range 4–10:1, and the concentration of the catalyst is in the range 85–95 percent HF in the reactor during on stream operation, and wherein when the catalyst is $H_2SO_4$ the temperature is in the range 20–70° F., the molar ratio of isobutane to propyl mercaptan is in the range 5–10:1, and the catalyst has a concentration in the range 82–94 percent $H_2SO_4$.

22. A reaction according to claim 20 wherein the low-boiling isoparaffin is isobutane, the low boiling alkyl mercaptan is ethyl mercaptan, wherein the catalyst is selected from hydrofluoric and sulfuric acids, wherein when hydrofluoric acid is selected as the catalyst, the temperature is in the approximate range of 100–140° F., the molar ratio of isobutane to ethyl mercaptan is 5–14:1, and the catalyst has a concentration of 88–95 percent HF, and wherein when the catalyst is $H_2SO_4$ the temperature is in the approximate range 40–90° F., the molar ratio of isobutane to ethyl mercaptan is 6–10:1, and the catalyst concentration is in the range 82–94 percent $H_2SO_4$.

References Cited in the file of this patent

UNITED STATES PATENTS

| | | |
|---|---|---|
| 2,061,271 | Buell et al. | Oct. 8, 1935 |
| 2,375,724 | Anderson et al. | May 8, 1945 |
| 2,386,769 | Badertscher et al. | Oct. 16, 1945 |
| 2,387,162 | Matuszak | Oct. 16, 1945 |
| 2,387,224 | Badertscher et al. | Oct. 16, 1945 |
| 2,436,550 | Brandon | Feb. 24, 1948 |
| 2,441,493 | Krug | May 11, 1948 |
| 2,494,341 | Lieber | Jan. 10, 1950 |

OTHER REFERENCES

Ellis: "The Chemistry of Petroleum Derivatives," vol. II, page 470 (1937), pub. by Reinhold Publishing Corp., New York, N. Y.

"The Chemistry of Petroleum Derivatives," Ellis, vol. II, pages 462 and 478 (1937), Reinhold Publishing Corp., New York, N. Y.

"Chemical Constituents of Petroleum," Sachanen, page 367 (1945), Reinhold Publishing Corp., New York, N. Y.